E. KING.
DIRIGIBLE LAMP MECHANISM FOR AUTOMOBILES.
APPLICATION FILED JULY 31, 1918.
1,361,468.
Patented Dec. 7, 1920.
2 SHEETS—SHEET 1.
Fig. 1.
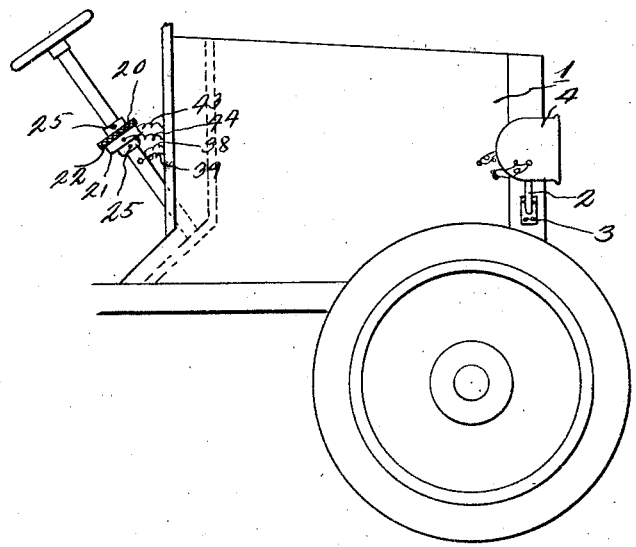
Fig. 3.
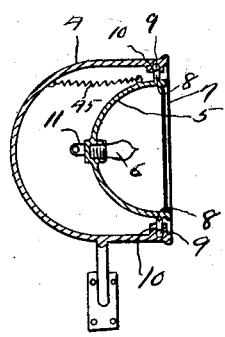
Fig. 2.
Witnesses
Philip Ferrell
Francis L. Orwell
Inventor
E. King
By D. Swift & Co.
his Attorneys

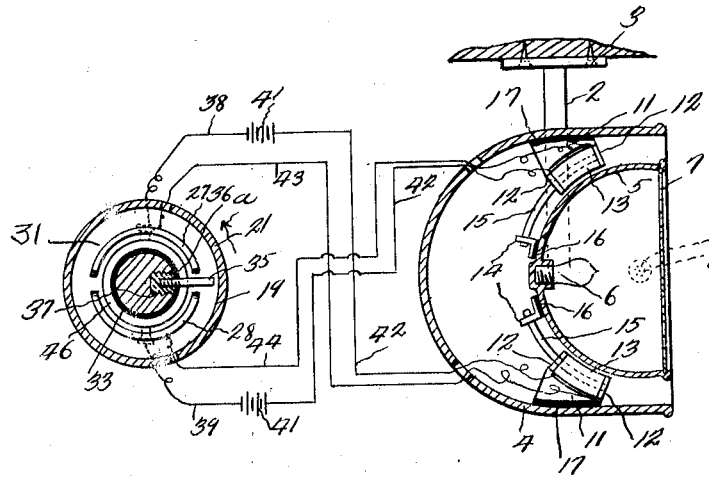
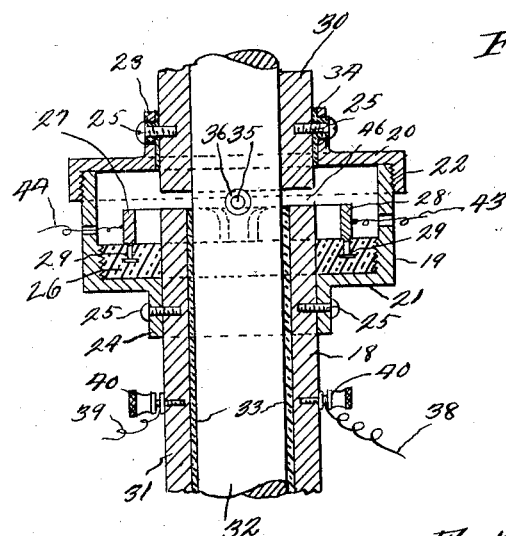

UNITED STATES PATENT OFFICE.

EDWARD KING, OF LACKAWANNA, NEW YORK, ASSIGNOR OF ONE-HALF TO JOHN LYNCH, OF BUFFALO, NEW YORK.

DIRIGIBLE-LAMP MECHANISM FOR AUTOMOBILES.

1,361,468.  Specification of Letters Patent.  Patented Dec. 7, 1920.

Application filed July 31, 1918. Serial No. 247,541.

*To all whom it may concern:*

Be it known that I, EDWARD KING, a citizen of the United States, residing at Lackawanna, in the county of Erie, State of New York, have invented a new and useful Dirigible-Lamp Mechanism for Automobiles; and I do hereby declare the following to be a full, clear, and exact description of the invention, such as will enable others skilled in the art to which it appertains to make and use the same.

This invention relates to an improved dirigible lamp mechanism for automobile, and the invention aims to provide a device of this kind which is electrically operated, whereby the lamp may be moved in the same direction with the front wheels.

The invention further aims to provide an electric circuit, a fulcrumed lamp, and means in said circuit, so that when the circuit is closed the lamp may be moved pivotally in one direction or the other with the front wheels of the automobile.

The invention further aims to provide a switch mechanism on the steering column, there being stationary contacts and a movable contact (which is carried by the rocking steering post) to move over the stationary contacts in one direction or the other for closing the circuit, in order to operate the electrical means of the fulcrumed lamp.

In practical fields the details of construction may necessitate alterations falling within the scope of what is claimed.

The invention comprises further features and combination of parts as hereinafter set forth, shown in the drawings and claimed.

In the drawings:—

Figure 1 is a view in side elevation of a portion of an automobile showing the electrically operated dirigible lamp mechanism applied.

Fig. 2 is a vertical sectional view through the steering column, showing the switch mechanism applied.

Fig. 3 is a vertical sectional view through the supported housing for the fulcrumed lamp.

Fig. 4 is a horizontal sectional view through the supported housing for the fulcrumed lamp and through the steering column, showing the switch mechanism applied, and electrical connections between the switch mechanism and means for electrically oscillating the reflector casing for the lamp.

Fig. 5 is an enlarged detail sectional view of the switch mechanism which is carried by the steering column.

Referring more especially to the drawings 1 designates the hood portion of an automobile to one side or each side of which a bracket 2 is secured as at 3. A housing 4 is integrally supported upon the bracket 2, and located in the housing is a reflector casing 5. This reflector casing is semi-spherical, and carries a suitable electric lamp 6, which may be lighted in the usual manner (not shown). The reflector casing has a front glass cover 7, and projecting upwardly and downwardly from the casing 5 at diametrically opposite points are axially alined fulcruming pins 8, which have thrust bearings 9 in the sockets 10 at diametrically opposite portions of the casing 4, above and below, and on the interior of the casing 4, whereby the reflector casing may oscillate laterally or horizontally. Secured in any suitable manner to the interior of the casing 4 at opposite sides are brackets 11, between the arms 12 of which suitable solenoids 13 are mounted. These solenoids are curved concentric with the reflector casing 5. Carried by the reflector casing 5 are spaced arms or supports 14, which carry the solenoid cores 15, which are curved, so as to be drawn into the solenoids when energized. The arms or supports 14 are secured to and insulated from the reflector casing 5 as shown at 16, so are the brackets 11 insulated as at 17 from the casing 4. A casing is carried by the steering tubular column 18. This casing 19 comprises the upper and lower sections 20 and 21, the flanges of which are threaded together as shown at 22. The two sections are provided with extension sleeves 23 and 24, which are secured by screws 25 to the tubular column 18. Threaded upon the interior of the section 21 and surrounding the tubular column 18 is an insulating ring 26, which carries the semicircular or segmental stationary contact members 27 and 28. These contact members 27 and 28 are secured to the insulating ring by the headed pin 29. It is to be noted that the tubular column 18 consists of the upper and lower parts 30 and 31, which are axially alined, and furthermore the lower part is insulated from the rocking or rotating steering post or column 32, as by means of the insulation 33. The upper section 20 of the casing 19 is insulated from the upper part 30 of the column 18 as shown at 34. A movable contact member 35 is carried by the rocking or rotating steering post 32, since its threaded extension 36 is threaded into an insulation filler 37, which is threaded into the steering post 32. Normally the contact member 35 assumes a position between one pair of the adjacent ends of the stationary contact members 27 and 28. Wires or leads 38 and 39 are connected by the thumb screws 40 to the tubular column 18, there being the usual batteries 41, from which the leads or wires 42 extend and are connected to the solenoids 13. Electrical wires 43 and 44 connect between the solenoids and the stationary contact members 27 and 28. Since the movable switch or contact member 35 is normally between one pair of adjacent ends of the contact members 27 and 28, the lamp will remain normally straight ahead, by reason of the tension spring 45, which connects between the reflector casing 5 and the casing 4, as indicated clearly in Fig. 3. However, when the steering post or column 32 is rocked in the direction of the arrow a, the contact member 35 will engage and ride over the contact member 27, and also over the upper edge of the part 31 of the tubular column 18, as at 46, in which case current will pass from one of the batteries 41 to the part 31 of the column 18 to the contact member 35 over the contact member 27 over the wire 43 to one of the solenoids, energizing the same and passing back to the battery 41 over the wire 42, which will oscillate the lamp and the reflector casing in the same direction with the front wheels. The rotating of the steering post 32 in the opposite direction will cause the contact member 35 to ride over the upper edge 46 of the part 31 of the column 18, and over and in contact with the contact member 28, as a result of which it will be obvious that the other solenoid will be energized and oscillate the reflector casing 5 in the opposite direction. In either case however, the contact member 35 should ride over the edge 46, and one or the other of the contact members 27 and 28, it depending on the direction of rotation of the post 32.

The invention having been set forth what is claimed as new and useful is:—

In an electrical dirigible lamp mechanism, the combination with a holder casing, of a reflector casing privotally mounted in said holder casing so as to swing in a horizontal plane on pivotal points at its top and bottom, said pivotal points being in vertical alinement with each other, a coiled spring connected to the reflector casing and to the holder casing and having its connecting points in longitudinal alinement with the pivotal points of the reflector casing, said spring normally maintaining the reflector casing in longitudinal position, curved solenoids carried by the walls of the holder casing and disposed on opposite sides of the reflector pivotal points, brackets extending outwardly from the rear side of the reflector casing, cores carried by said brackets and bent concentrically with the reflector pivotal point, the ends of said cores being disposed in the curved solenoids and means for energizing and controlling the energizing of the solenoids.

In testimony whereof I have signed my name to this specification in the presence of two subscribing witnesses.

EDWARD KING.

Witnesses:
F. J. TWIST,
KATHRYN MACK.